United States Patent
Trautmann et al.

(10) Patent No.: US 7,062,448 B2
(45) Date of Patent: Jun. 13, 2006

(54) METHOD OF PLANT OCCUPANCY PLANNING IN THE PROCESS INDUSTRY

(75) Inventors: Norbert Trautmann, Karlsruhe (DE); Christoph Schwindt, Neewiller (FR)

(73) Assignee: SAP AG, Walldorf (DE)

(*) Notice: Subject to any disclaimer, the term of this patent is extended or adjusted under 35 U.S.C. 154(b) by 0 days.

(21) Appl. No.: 10/985,759

(22) Filed: Nov. 10, 2004

(65) Prior Publication Data

US 2005/0086094 A1 Apr. 21, 2005

Related U.S. Application Data

(63) Continuation of application No. 09/825,555, filed on Mar. 23, 2001.

(51) Int. Cl.
*G06F 17/60* (2006.01)
(52) U.S. Cl. .............................. 705/8; 705/7
(58) Field of Classification Search ............ 705/7, 705/8
See application file for complete search history.

(56) References Cited

U.S. PATENT DOCUMENTS

| | | | | |
|---|---|---|---|---|
| 5,343,388 | A * | 8/1994 | Wedelin .................... | 705/8 |
| 6,035,277 | A * | 3/2000 | Anbil et al. ................ | 705/8 |
| 6,351,734 | B1 * | 2/2002 | Lautzenheiser et al. ...... | 705/8 |
| 6,578,005 | B1 * | 6/2003 | Lesaint et al. ............. | 705/8 |

FOREIGN PATENT DOCUMENTS

| | | | |
|---|---|---|---|
| EP | 0639815 A2 | * | 8/1993 |
| EP | 0818747 A2 | * | 1/1998 |
| WO | WO1992/003905 | * | 3/1992 |
| WO | WO9822897 A2 | * | 5/1998 |

OTHER PUBLICATIONS

Matta et al., Dynamic Production Scheduling for a Process Industry, Operations Research, vol. 42, No. 3, May-Jun. 1994, p. 492-503 [JSTOR].*

Reyck et al., Local Search Methods for the Discrete Time/Resource Trade-off Problem in Project Networks, Operations Management Group, Department of Applied Economics, Katholieke Universieit Leuven, Mar. 2, 1998 [GOOGLE].*

Knotts et al., Agent-Based Project Scheduling, IIE Transactions, vol. 32, No. 5, May 2000, p. 387-401 [PROQUEST].*

Wall, A Generic Algorithm for Resource-Constrained Scheduling, Massachusetts Institute of Technology, Jun. 1996 [GOOGLE].*

Sprecher, Scheduling Resource-Constrained Projects Competitively at Modest Memory Requirement, Management Science, vol. 46, No. 5, May 2000, p. 710-723 [PROQUEST].*

(Continued)

*Primary Examiner*—Romain Jeanty
(74) *Attorney, Agent, or Firm*—Finnegan, Henderson, Farabow, Garrett & Dunner, L.L.P.

(57) ABSTRACT

A method based on an integrative relaxation principle is proposed for plant occupancy planning in the process industry, for which a relaxation that simplifies the resource problem is formed and the relaxed problem is solved, and conflicts contained in the solution of the relaxation problem are solved by precedence relationships between operations and the selection of resources.

44 Claims, 2 Drawing Sheets

OTHER PUBLICATIONS

Figure 1:
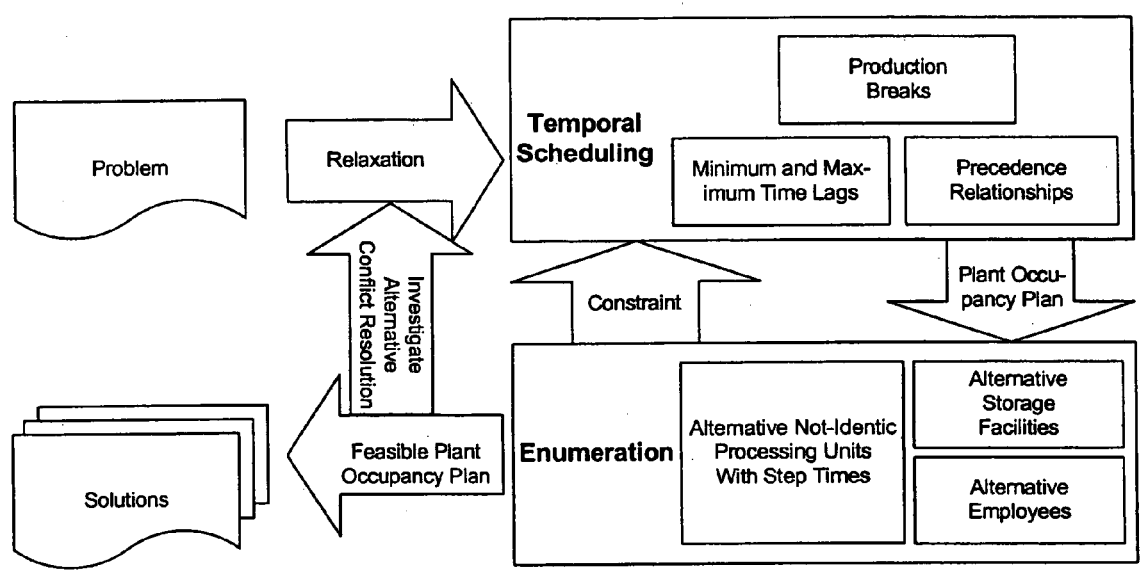

Zhang et al., A Macro-Level Scheduling Method Using Lagrangian Relaxation, IEEE Tranactions on Robotics and Automation, vol. 17, No. 1, Feb. 2001, p. 70-79 [GOOGLE].*

Dorndorf et al "A time-oriented branch-and-bound algorithm for resource-constrained project scheduling with generalised constraints"; Oct. 2002; Management Science vol. 46, No. 10; Dialog file 2, Accession No. 07903863*

Franck, B. 1999: Prioritätsregelverfahren für die ressourcenbeschränkte Projektplanung mit und ohne Kalender. Shaker, Aachen.

Heilmann, R. 1998: A branch-and-bound procedure for MRCPSP/max. Report WIOR-512, Universität Karlsruhe.

Neumann, K., Schwindt, C. 1997: Activity-on-node networks with minimal and maximal time lags and their application to make-to-order production. OR Spektrum 19, 205-217.

Neumann, K., Schwindt, C. 1999: Project scheduling with inventory constraints. Report WIOR-572, Universität Karlsruhe.

Schwindt, C. 1998: Verfahren zur Lösung des ressourcenbeschränkten Projektdauerminimierungsproblems mit planungsabhängigen Zeitfenstern. Shaker, Aachen.

Trautmann, N. 1998a: Über die Modellierung von Produktionsplanungsproblemen der Prozeβindustrie als ressourcenbeschränkte Projektplanungsprobleme. Report WIOR-521, Universität Karlsruhe.

Trautmann, N. 1998b: Kalendrierung von Projekten mit planungsabhängigen Zeitfenstern und unterbrechbaren Vorgängen. Report WIOR-535, Universitä t Karlsruhe.

Renato De Mata and Monique Guignard, 1994: Dynamic Production Scheduling for a Process Industry. Operations Research, vol. 42, No. 3, pp. 492-503.

Neumann K., Schwindt C., Zimmermann J. 2003: Project Scheduling with Time Windows and Scarce Resources, p. 177-194 (Springer, 2nd Ed. Berlin).

* cited by examiner

METHOD OF PLANT OCCUPANCY PLANNING IN THE PROCESS INDUSTRY

This is a continuation of application Ser. No. 09/825,555, filed Mar. 23, 2001, which is incorporated herein by reference.

This invention relates to a method for automated, computer-assisted plant occupancy planning in the process industry by means of an integrative relaxation approach for sequencing optimization in batch production. This procedure is used to allocate resources over time to a set of operations arising from batch planning. The plant to be occupied is a multipurpose plant producing end products from raw materials by means of chemical and/or physical transformations that are carried out in succession. Examples of such transformation steps include chemical reactions, filtration, mixing, and packaging. The execution of these operations requires resources, and productional restrictions must be taken into account in carrying out these operations.

The process industry includes in particular the chemical industry, the pharmaceutical industry, the food industry, the petroleum industry, the metallurgy industry, and the paper industry.

This invention is aimed at plants operated in batch mode, i.e., the quantity of input materials required to carry out an operation is consumed at the beginning of the process, and the amount of output materials produced by an operation is available at the end of the operation. Such batch production is typical of chemical and pharmaceutical production plants in particular. One advantage of batch production is the possibility of inexpensive production of a wide variety of final products even in small quantities.

Production planning usually takes place in two stages. In batch planning, the number and size of the individual batches to be processed are determined for each transformation step. The production of one batch using resources corresponds to one operation. The job of subsequent plant occupancy planning is the allocation over-time of resources including employees, inventories, and processing units to the operations arising from batch planning. Thus, plant occupancy planning is sequencing for a short-term planning period. This is also referred to as batch scheduling. This can be done with various goals, such as minimizing the total production time (makespan) or minimizing overruns of prescribed deadlines for individual operations.

The execution of operations takes place on multipurpose installations including processing units and substance-specific storage-facilities. Employees who may have various qualifications are needed to operate the processing units. At the beginning of an operation, the proper amount of input materials is consumed, and at the end of an operation the output materials that cannot be processed further immediately must be stored.

In addition, it may be necessary in plant occupancy planning to take into account various productional restrictions. For example, individual substances may have a quarantine time or a shelf life time after which they may or must be processed further at the soonest or at the latest. A minimum and maximum inventory is specified for each storage facility and the inventory must remain between these two bounds. Furthermore, the total availability of processing units and employees as resources is always limited. Another restriction may be defined as being that many resources can be used only for certain operations. Thus, for example, certain operations may be carried out only by certain employees on certain processing units.

Another particular productional aspect may consist of the fact that processing units must be set up between the execution of individual operations. Such a setup may include cleaning, for example. The duration of this setup may depend on the sequence in which the operations are carried out. With regard to employees, it must be taken into account that the number of employees may vary over time. Thus, for example, fewer employees are usually available during a night shift than during a day shift.

In addition, operations may often be carried out in several ways, which may differ with regard to the resources used as well as the duration of the operation. Breaks may be specified for the processing units and employees as resources, so they are not available for carrying out operations during these breaks. Many operations may be interrupted at the beginning of such a break and must then be resumed immediately after the break. However, there are also operations that must not be interrupted at all.

The goal is to establish a plant occupancy plan, i.e., a selection of resources as well as a start time and a completion time for all operations in such a way that all the productional restrictions are met.

Partial aspects of batch production that are taken into account in plant occupancy planning can be represented (modeled) as a resource-constrained project of the type "multimode resource-constrained project scheduling problem with minimum and maximum time lags." Such a project consists of a set of activities which use renewable resources during their execution, between whose start times prescribed minimum and maximum time lags are to be observed and which must be carried out in one of several alternative modes. Each activity in this type of model corresponds to one operation, i.e., production of one batch. Shelf life times and quarantine times for products are modeled by means of minimum and maximum time lags between the respective activities. A set of renewable resources is available for carrying out the activities. A renewable resource would be, for example, a group of employees having the same qualifications or a group of identical processing units that do not have to be set up. The available capacity of a renewable resource is constant over time and corresponds to the number of employees or processing units by which they are modeled.

Each activity uses during its execution as many units of the individual renewable resources as required by the respective employees or processing units for execution of the corresponding activity. If fewer employees are available in a period of time (e.g., during a night shift), this is modeled by additional fictitious activities that are fixed in time by minimum and maximum time lags and take up the difference between the maximum availability and the actual availability. A mode is defined for each possible selection of resources for an operation. Thus, the demand on renewable resources and the duration of the activities depend on the mode selected.

A feasible solution to such a project planning problem will assign exactly one mode and one start time to each activity, so that the minimum and maximum time lags between operations are observed and at no time is more capacity of a renewable resource required than is available.

A feasible solution is regarded as optimal if there is no feasible solution to the project planning problem whereby the project is completed sooner.

This project planning problem, which is known from the state of the art, is NP-hard, i.e., according to current knowledge, it cannot be solved to optimality within a computation time which is described as a polynomial in terms of problem size (number of activities, resources, and modes). A known solution approach for such project planning problems, which occur, for example, in construction site planning, in the development of software with a large number of developers involved, or in the planning of meetings, is the Heilmann method of 1998. In this known method, the problem is first relaxed, i.e., a feasible solution is determined to the problem where it is not necessary to determine precisely one mode for each activity and the restriction on capacity of renewable resources may be disregarded. We speak of a relaxed problem or relaxation when some or all constraints of an optimization problem are omitted or replaced by weaker constraints.

In the method known from Heilmann 1998 for project planning, the relaxation is obtained by assuming for each activity the minimum execution time in all modes, the minimum demand on renewable resources, the smallest minimum time lags, and the largest maximum time lags. The remaining problem of temporal scheduling, i.e., determining start times for each activity so that the minimum and maximum time lags are observed but the capacity limits of renewable resources may be disregarded, corresponds to the known problem of determining the longest paths in a network. If the solution to this temporal scheduling problem at any time violates the restriction on the capacity of a renewable resource, this violation is eliminated by introducing precedence relationships between the activities that concur about the capacity of the resource at this time. Then temporal scheduling is performed again, taking into account the additional precedence relationship. If no violation of a resource restriction is found, then there is a search for an activity for which no mode has yet been selected. If a mode has been selected for each activity, a feasible solution is obtained. Otherwise, one mode is selected for some activity. If there are multiple possibilities for defining precedence relationships among competing activities or selecting one mode for some activity, then one possibility is selected first and the procedure is continued with this possibility. The other possibilities are stored in the form of a decision tree.

In the known project planning method of Heilmann 1998, the steps temporal scheduling and introduction of precedence relationships and selection of a mode are repeated until a feasible solution has been found or the constraints to be taken into account in temporal scheduling are in conflict. In both cases, the procedure returns to the previous level in the decision tree and a different alternative is considered.

There is no known solution in the state of the art for performing plant occupancy planning in the process industry by means of modeling and relaxation comparable to the method of project planning known from Heilmann 1998 (see also Schwindt 1998 for the case without alternative modes).

It is known that the entire problem of plant occupancy planning can be formulated as a mixed-integer optimization problem and solved with the help of standard software. All the productional restrictions can be modeled and taken into account in that way. The disadvantage of this method, however, is that computation times in the range of a few days up to several decades or even more are usually necessary to solve planning problems of a realistic size.

For this reason, there have been proposed solutions in the state of the art concerned with partial aspects of plant occupancy planning that cannot be taken into account in the modeling as a project scheduling problem according to Heilmann 1998. One example of this is the literature citation Neumann & Schwindt 1999, where project scheduling problems are considered with cumulative resources without alternative modes for activities. A cumulative resource is limited from below by a minimum inventory and from above by a maximum inventory. An activity may require cumulative resources in a positive manner, i.e., increase inventories, or in a negative manner, i.e., reduce inventories. Restrictions on storage (minimum and maximum inventories) can be modeled with the help of cumulative resources.

The literature citation Franck 1999 for taking into account resource calendars without alternative modes for activities is another example from the state of the art for proposed solutions aimed at partial aspects of plant occupancy planning. Resource calendars define periods of time during which renewable resources may not be used by activities. Production breaks can be modeled with the help of resource calendars.

However, it is surprising for those skilled in the art that a sequential combination of the known methods, e.g., first according to Heilmann 1998 and then according to Neumann & Schwindt 1999 and Franck 1999 does not lead to a plant occupancy planning that is feasible, let alone optimal.

In addition, it is known that plant occupancy problems can be modeled as resource-constrained project scheduling problems, e.g., from Trautmann 1998a based on Neumann & Schwindt 1997. However, no solution method is known from the state of the art for project scheduling problems modeled in this way.

The methods of plant occupancy planning known from the state of the art are limited to installations in which products can be stored and made available in any desired quantities, where the processing units need not be set up between different operations, and where no production breaks are to be taken into account. Since these prerequisites are not usually met in planning the occupancy of real-world plants, the methods known from the state of the art are thus suitable only for solving special cases but do not constitute a generally applicable method of solving the problems of plant occupancy planning.

A method of plant occupancy planning with limited resources is known from the document WO 99/63471. The known method is based on the use of the principle of local search by means of priority-rule methods. No restriction on inventories can be taken into account here.

The object of the present invention is to create a method of plant occupancy planning which is suitable for solving real problems and leads to an optimal solution or at least a good feasible solution (in investigation of only a portion of the set of all feasible solutions) within a short computation time in comparison with the solution of mixed-integer problems.

This object is achieved in accordance with this invention by a method having the features of the accompanying claim 1. Preferred embodiments and refinements of this invention are derived from the sub claims and the following description with the respective drawings.

In a method in accordance with this invention for automated computer-supported planning of the occupancy of a plant in the process industry by means of an integrative relaxation approach for the sequencing of a discontinuous batch production and for allocation of production resources over-time to a set of operations arising from batch planning, a plant occupancy plan is developed for a plant which is a multipurpose plant used for producing final products from raw materials by means of chemical and/or physical transformation steps that are carried out in succession. During their execution, the operations use resources that may be available in multiples. Productional restrictions are to be taken into account in the execution of operations. This process is based on the modeling of the problem of plant occupancy planning as a resource-constrained project scheduling problem known and described in the literature citation Trautmann 1998a. The problem of plant occupancy planning to be solved is modeled as a resource-constrained project scheduling problem taking into account the productional restrictions, where each operation corresponds to an activity of the project for which one execution mode, one start time and one completion time are to be defined, which during their execution use renewable resources (employees), setup resources (processing units), and cumulative resources (inventories), for which limits are defined, and where minimum and maximum time lags (shelf life times, quarantine times, release dates, deadlines) are to be observed between the activities.

In a first step of the method, first a relaxation of the problem modeled is formed that simplifies the resource problem, so that the restrictions on availability of resources are disregarded, and minimum and maximum time lags between operations and productional restrictions such as production breaks which are independent of the selection of resources for operations are taken into account.

In a second step, the temporal scheduling problem for the relaxed problem of plant occupancy planning is solved as a calendarization problem in networks with the help of an iterative method. According to a preferred additional feature, the iterative method is a label-correcting method known from the literature citation Trautmann 1998a, for example.

In a third step, the solution to the temporal scheduling problem is checked for its feasibility with respect to the non-relaxed problem of plant occupancy planning. If it is found here that restrictions on the availability of resources are violated in the solution of the temporal scheduling problem, then these violations are resolved by introducing precedence relationships. If it is found here that not all resources have been selected in the solution of the temporal scheduling problem for the execution of an operation, then the resources are selected.

The second step (temporal scheduling subject to the precedence relationships introduced and the choices of resources made) and the third step (introducing precedence relationships and the selection of resources) are continued until a feasible plant occupancy plan has been found or until the constraints to be taken into account in the second step of temporal scheduling are contradictory.

If one possibility investigated does not violate any productional restrictions, then the plant occupancy plan is stored as a feasible solution and the procedure continues with the investigation of possibilities that have not yet been checked according to the third step. Then a best solution is determined from all feasible solutions determined in the second step, where different objective functions that do not decrease in the completion times of the operations can be used as the criterion for what is sought as the best solution.

A special advantage of this invention in comparison with the state of the art is that it is possible to take into account restrictions with respect to production breaks for processing units and employees, with respect to processing units with setup times that depend on sequence, and with respect to inventories. As part of this invention, it has been found that such restrictions cannot be considered in isolation, so a successive execution of the different known methods to solve partial aspects will not generally lead to an feasible plant occupancy plan that solves the plant problem on the whole.

It has also been found that a consideration of all the constraints or productional restrictions is possible within the scope of the present invention because different conflict resolution procedures can be introduced for the types of conflicts that occur, having the common property of again leading to a calendarization problem in networks, which can be solved with an iterative method, preferably a label-correcting method. For those skilled in the art, the latter finding is surprising, as is the fact that, unlike a successive execution of the individual known methods, which solve partial aspects, the simultaneous consideration of all constraints in accordance with this invention leads to the solution.

In addition, the method in accordance with this invention has the advantage that it requires comparatively little computation time and it yields the desired plant occupancy plan within a short period of time. The method in accordance with this invention has the advantage that for problems of plant occupancy planning with a size and complexity that are relevant for practical conditions, where approximately 100 to 1,000 operations are to be carried out, good feasible solutions can be obtained within a few minutes of computation time through a suitable computer program instead of, as is the case with the methods of mixed-integer optimization in accordance with the state of the art, no feasible solution being found even after many hours of computation time. The method in accordance with this invention can be implemented on a computer as a so-called branch-and-bound method, for example.

This invention thus yields a method of efficient plant occupancy planning in the process industry on the basis of an expansion of the method known from Heilmann 1998 for the area of project planning, where, unlike the related art, the complex real productional restrictions and restrictions on resources which exist in practical problems of plant occupancy planning can be taken into account.

The method in accordance with this invention is based essentially on the fact that first a relaxation of the problem is considered, disregarding the restrictions on the availability of resources. Then the temporal scheduling problem is solved for the relaxed problem, taking into account the maximum and minimum time lags and production breaks. If, in solving the temporal scheduling problem, restrictions on the availability of resources are violated, then these violations are eliminated by introducing appropriate precedence relationships. Depending on the type of resource, the violation can be detected in a certain suitable manner and solved by a suitable type of precedence relationship. If it is found that no resources (from the set of alternative resources given by technology) have yet been selected for an operation, then a selection can be made by restricting the resources that can be selected. After the introduction of precedence relationships or the selection of resources, temporal scheduling is performed again, taking into account the precedence relationships introduced and the resources that can still be selected.

If there are several possibilities of defining precedence relationships between competing operations or selecting resources for a given operation, then one possibility is selected first and the procedure is continued with it. The other possibilities can then be stored in the form of a decision tree. The steps temporal scheduling and insertion of precedence relationships or selection of resources are then repeated until a feasible plant occupancy plan has been found or the constraints to be taken into account in temporal scheduling are contradictory, i.e., in this case no feasible solution is found. In both cases, the procedure returns to the previous level in the decision tree and a different alternative is checked for its feasibility.

According to another advantageous feature, it is proposed that several possibilities of precedence relationships between competing operations are stored in the form of a decision tree. To carry out this method by means of a computer, it may also be advantageous if several possibilities of selecting resources are stored in the form of a decision tree.

The resources taken into account in the method in accordance with this invention may include one or more of the following resources: employees having the same qualifications, processing units, and storage facilities.

According to additional advantageous features, one or more of the following productional restrictions may also be taken into account: a quarantine time for output materials after which they can be processed further at the earliest, and a shelf life time for output materials after which they must be processed further at the latest, a release date for input materials, a due date for operations, restrictions on availability of resources, a setup time for processing units, the dependence of the setup time on the sequence of operations, the time dependence of the availability of employees of the same qualification as a resource, production breaks for processing units and employees, the minimum and maximum inventories in storage.

It is possible within the scope of this invention to use different objective criteria to evaluate feasible or optimal solutions. As a rule, one strives at minimizing the makespan, i.e., the period of time between the beginning of production, which is a fixed given, and the end of the last operation. In other variants, it is possible to provide for the observance of deadlines to be optimized, i.e., the average or maximum overrun of given deadlines for individual operations may be minimized.

Figure 2:
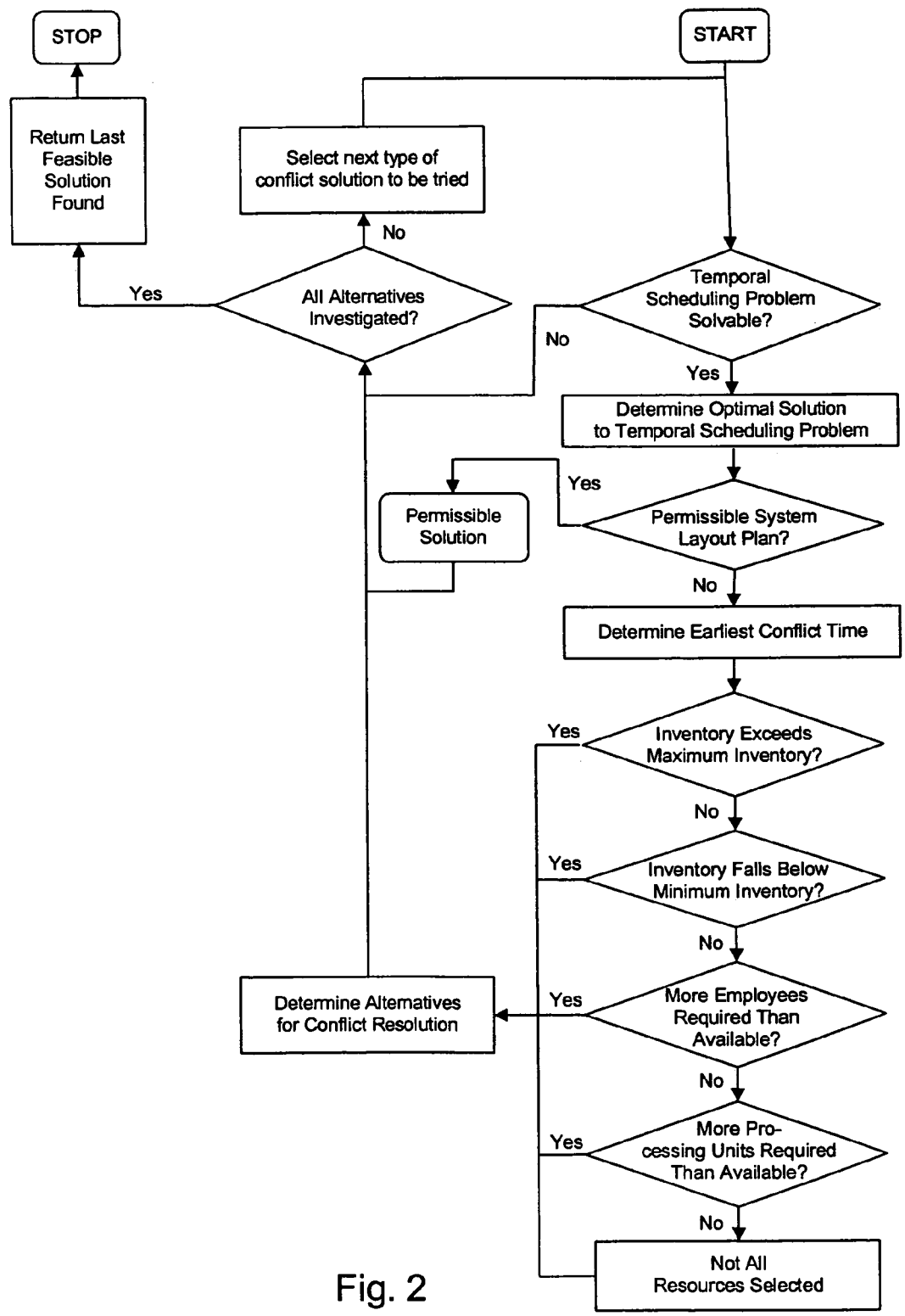

This invention is explained in greater detail below on the basis of an embodiment that is illustrated in the figures. The particular details described here may be used individually or in any combination to create preferred embodiments of this invention. The figures show:

FIG. 1 an overview of a method in accordance with this invention for plant occupancy planning in the process industry and FIG. 2 details of the method in a flow chart.

FIG. 1 shows a schematic overview of the method in accordance with this invention. First, the optimization problem of plant occupancy planning is modeled in a known way. In addition to the state of the art, the following restrictions are taken into account:

1) The interruptibility of operations. This can be done according to the literature citation Trautmann 1998b, which describes how the completion time of an operation can be represented as a function of the start time, the duration and the breaks. However, if a solution obtained in a method such as that known from the literature citation Heilmann 1998a is calendarized according to the literature citation Trautmann 1998b, this does not usually yield a feasible plant occupancy plan, contrary to the method in accordance with this invention.

2) In addition to employees of the same qualification (renewable resources), restrictions on inventories, which are modeled as cumulative resources, are also taken into account. This can be done according to the literature citation Neumann & Schwindt 1999. The inventories of a cumulative resource at a given time are obtained as the sum of the incoming and outgoing stock up to that time. For a cumulative resource, minimum and maximum inventories constant over time are specified.

If an operation sends output materials to storage, then the corresponding activity makes a positive demand on the corresponding cumulative resource at its completion time. If an operation removes input materials from storage, then the corresponding activity has a negative demand at its start-time. A plant occupancy plan is regarded as feasible if the inventories of a cumulative resource at no time drop below the minimum inventory or exceed the maximum inventory.

It should be pointed out that a solution obtained by the method according to Heilmann 1998 and processed further with the method described in Neumann & Schwindt 1999 for sequencing cumulative resources does not usually provide a feasible plant occupancy plan, unlike the method in accordance with this invention.

3) In addition to employees of the same qualification and restrictions on inventories in storage facilities, processing units with sequence-dependent setup times are also taken into account. This can be done according to the literature citation Trautmann 1998a. A processing unit is modelled by a setup resource. If an operation occupies a processing unit while it is being carried out, then it requires the setup resource during its execution. If alternative processing units are available for carrying out the operation, this can be modeled by corresponding modes. A sufficient amount of time must remain between the execution of two operations carried out in direct succession on the same processing unit so that the processing unit can be set up. A plant occupancy plan is regarded as feasible in terms of setting up the processing unit if sufficient time for setup remains between two successive operations carried out on the same setup resource.

It should be pointed out here that a solution obtained by the method according to Heilmann 1998 and developed further with a method of plant occupancy planning with sequence-dependent setup times does not usually supply a feasible plant occupancy plan, unlike the method in accordance with this invention.

At the beginning of the method in accordance with this invention, a relaxation of the problem is considered, where only that part of the productional restrictions is taken into account which is independent of the selection of resources for individual operations, i.e., the minimum duration with respect to all possible choices of resources, the smallest minimum time lags and the longest maximum time lags, the smallest demand on each renewable resource and each setup resource, the highest inventory profile when checking against the minimum inventory and the lowest inventory profile when checking against the maximum inventory of the cumulative resource as well as the breaks which are to be taken into account independently of the choice of mode.

The temporal scheduling determines a plant occupancy plan that is optimal with regard to the objective criterion without taking into account the restrictions on the availability of resources. This plant occupancy plan is investigated for conflicts, i.e., violations of the restrictions on the availability of resources, in the step "enumeration" (resource selection and conflict resolution by eliminating the violations of resource restrictions). To resolve such a resource conflict, an additional precedence relationship is introduced, delaying a non-empty set of operations. If there are no more resource conflicts in the current plant occupancy plan, then a selection of resources is made for at least one operation. In both cases, temporal scheduling is performed by taking into account the modified sets of alternative modes and the expanded set of precedence relationships.

In the relaxation of resources of the problem of plant occupancy planning, the constraints referring to the restricted availability of input materials, storage space for output products, employees of the equal qualification, and equipment are eliminated. It has surprisingly been found that the remaining calendarization problem in networks can be solved efficiently, where the determination of an optimal solution does not require enumeration of feasible solutions.

The remaining problem of temporal scheduling consists of determining a plant occupancy plan that observes all of the minimum and maximum time lags as well as the production breaks for processing units and employees. This problem can be solved, for example, with a method according to the literature citation Trautmann 1998b. This is an expansion of methods of calculating the longest paths in networks, exploiting the fact that the completion time of an operation is an efficiently computable function of the start time, the duration and breaks.

The productional restrictions represented in the upper half of FIG. 1 "temporal scheduling" represent "simple" problems, so to speak, and the productional restrictions represented in the lower half "enumeration" represent "difficult" problems.

In a plant occupancy plan that is investigated, the earliest start time or completion time of an operation at which a conflict occurs is determined. Details in this regard and the possibilities of conflict resolution are explained in conjunction with FIG. 2.

The feasible plant occupancy plans are investigated (enumeration over all feasible variants) and the plant occupancy plans that are found to be feasible are stored as a solution set from which the best solution can be determined by taking into account the desired objective criterion.

FIG. 2 illustrates details of the preferred embodiment of a method in accordance with this invention, especially with regard to conflict resolution. After the start of the method, it is first checked whether the temporal scheduling problem, i.e., the calendarization problem in networks, can be solved. If the answer is yes, then an optimal solution to the temporal scheduling problem is determined in a known way. Then a check is performed to determine whether the plant occupancy plan thus found represents a feasible solution. If the answer is yes, then the best solution has just been found.

If a conflict occurs in a plant occupancy plan investigated in the third step to determine whether it is a feasible solution, then preferably the earliest start time or completion time of an operation at which one of the following conflicts occurs is determined:
a) the inventory in storage exceeds the prescribed maximum inventory,
b) the inventory in storage is lower than the presribed minimum inventory,
c) the number of employees required exceeds the number of employees available,
d) the demand for processing units by operations and setups exceeds the number of processing units available,
e) an operation is started but some resources required for its execution have not yet been selected.

A check of conflicts a) through e) can be carried out in principle in any desired chronological order. Within the scope of this invention, it has been found that it is preferable to perform the check of conflicts a) through d) in the priority sequence a) through d).

It has been found that a hierarchical criterion is most suitable for deciding the answer to the question of which possibility of conflict resolution is to be investigated next, where this criterion takes into account the sum of infeasibilities with regard to inventories (falling below the safety stocks and exceeding storage capacities) and the difference between the sum of the completion times of all operations before and after the resolution of the conflict.

Conflict e) can be checked at a suitable time. It is advantageous if conflict e) is checked before checking conflicts a) through d) or after checking conflicts a) through d), where the last embodiment is preferred.

The existence of a conflict a) can be checked, for example, according to the literature citation Neumann & Schwindt 1999. To do so, the start and completion times of the operations are sorted in ascending order. Then a check is performed for each storage facility to determine whether or not at any start time or completion time of an operation, the maximum inventory is exceeded by the sum of the maximum withdrawals and minimum additions that have taken place up to the respective point in time with respect to all possible selections of resources for all operations.

The presence of a conflict b) can also be checked according to the literature citation Neumann & Schwindt 1999 by sorting the start and completion times of the operations in ascending order and then checking for each storage facility whether or not at any start time or completion time of an operation the sum of minimum withdrawals and maximum additions that have taken place up to the respective point in time with respect to all possible selections of resources for all operations is lower than the minimum inventory.

The presence of a conflict c) can be checked according to the literature citation Heilmann 1998 by sorting the start times of the operations in ascending order. Then a check is performed for each group of employees of the same qualification to determine whether or not at any start time of an operation, the sum of the demands on employees, which are minimal for all operations with respect to all possible choices of resources, is greater at this time than the available number of employees.

The presence of a conflict d) can be checked according to the literature citation Trautmann 1998a by sorting the start times of the operations in ascending order. Then a check is performed for each processing unit to determine whether the time lag between the end of the first operation and the start of the second operation is sufficient for setup, regardless of the selection of resources on this processing unit.

The existence of a conflict e) can be checked according to the literature citation Heilmann 1998 by determining the set of choices of resources which is still possible for each operation and, if the set is a singleton, assuming that the choice of resources has been made according to the element contained in the set.

If no more conflict is found, then the plant occupancy plan investigated is feasible and the procedure continues with a possibility that has not yet been investigated for resolving a recently determined conflict. If all possibilities have been investigated, then the procedure continues with the next-to-last conflict, etc. When all possibilities of resolving conflicts have been investigated, the procedure is terminated. The best plant occupancy plan according to the objective criterion is then returned.

In the case of occurrence of a conflict in a plant occupancy plan that has been investigated, an attempt is made to resolve the conflict. This can preferably take place by selecting one possibility of attempting to resolve a conflict that occurs, introducing precedence relationships or restricting the allowed choices of resources and storing the other possibilities in a decision tree.

In an advantageous practical implementation of the method in accordance with this invention, the total number of possibilities investigated for resolving a conflict enters into the computation. In each conflict, preferably first all alternatives of conflict resolution are sorted according to a weighting key, which is preferably as simple to calculate as possible, and a portion which depends on the size of the problem is sorted out. The remaining part is sorted according to the given criteria.

In a conflict case a), one can determine the possibilities of delaying the completion time of an operation which by the time of the conflict has increased the inventories in storage where the conflict occurred in all possible choices of resources at least until the earliest start time of an operation which after the conflict time reduces the inventories in the storage in which the conflict occurred in all possible choices of resources, and then these possibilities are stored in the form of precedence relationships.

In a conflict case b) one can determine the possibilities of delaying the start time of an operation which by the conflict time has reduced the inventories in the storage in which the conflict occurred in all possible choices of resources until the earliest completion time of an operation which after the conflict time increases the inventories in the storage in which the conflict occurred in all possible choices of resources, and these possibilities can then be stored in the form of precedence relationships.

In a conflict case c), one can determine the possibilities of delaying the start time of an operation which at the time of the conflict requires the employees of the same qualification as a resource in which the conflict occurred in all possible choices of resources at least until the earliest possible completion time of an operation that at the time of the conflict requires the resource of employees in which the conflict occurred in all possible choices of resources, and then these possibilities are stored in the form of precedence relationships.

In a conflict case d), one can determine the possibilities of delaying the start time of one of the two operations involved in the conflict until at least the completion time of the other operation involved in the conflict plus the setup time between the two operations, and these two possibilities are stored in the form of precedence relationships.

In a conflict case e) one can determine the possibilities of restricting the set of possible choices of resources of an operation starting at a conflict time to one element and storing these possibilities in the form of the restricted sets.

In each case, one of the possibilities of resolving the conflict is selected and the method is continued, taking into account the additional precedence relationships and the restrictions on the sets of selectable resources. The other possibilities are stored in a decision tree and investigated later.

The invention claimed is:

1. A method of automated, computer-assisted plant occupancy planning in a process industry for sequencing of a discontinuous batch production and allocation of resources over time to a set of operations arising from batch planning that during execution use resources and require that productional restrictions be taken into account, and optimizing plant occupancy planning by modeling the plant occupancy planning as a resource-constrained project scheduling problem, taking into account the productional restrictions, each operation corresponding to an activity of the project having an execution mode, a start time and an completion time, and account restrictions on the availability of required resources and temporal constraints, the method comprising:

executing software in a first stage to form a relaxation which simplifies the resource-constrained project scheduling problem, disregarding the restrictions on the availability of required resources, and taking into account the productional restrictions, the productional restrictions comprising minimum and maximum time lags between operations and a production break type which are independent of resources operations selection;

executing software in a second stage to solve a temporal scheduling problem as a calendarization problem in networks using an iterative process;

executing software in a third stage to investigate a solution to the temporal scheduling problem for its feasibility with respect to a non-relaxed problem of plant occupancy planning wherein if it is found that restrictions on availability of resources are violated in solving the temporal scheduling problem, violations are solved by introducing precedence relationships, and if it is found that not all resources have been selected for carrying out an operation, the unselected resources are selected;

wherein the second stage of temporal scheduling and the third stage of introducing precedence relationships and selecting resources continue until a feasible plant occupancy plan has been determined or until the constraints to be taken into account in the second stage of temporal scheduling are contradictory, if a possibility investigated does not violate any productional restrictions, the plant occupancy plan is stored as a feasible solution and;

wherein an investigation of possibilities according to the third stage that has not yet been reviewed is continued and a best solution with regard to a selectable objective function that does not decrease in the completion times of the operations is determined from the feasible solutions determined in the second stage.

2. The method in accordance with claim 1, wherein several possibilities of precedence relationships between competing operations are stored in the form of a decision tree.

3. The method in accordance with claim 1, wherein several possibilities of resource selection are stored in the form of a decision tree.

4. The method in accordance with claim 1, wherein the iterative method used in the second stage is a label-correcting method.

5. The method in accordance with claim 1, wherein in a plant occupancy plan which is investigated in the third stage as a feasible solution, the earliest start time or completion time of an operation at which one of the following conflicts occurs is determined:

a) inventory in a storage facility exceeds the prescribed maximum inventory;

b) inventory in a storage facility is lower than the prescribed minimum inventory;

c) a number of employees required exceeds a number of employees available;

d) demand for processing units by operations and setups exceeds a number of processing units available; or e) an operation is started, but some resources required for its execution have not yet been selected.

6. The method in accordance with claim 5, wherein conflicts a) through d) are checked in the priority sequence a) through d).

7. The method in accordance with claim 5, wherein conflict e) is checked before conflicts a) through d) are checked.

8. The method in accordance with claim 5, wherein conflict e) is checked after conflicts a) through d) are checked.

9. The method in accordance with claim 5, wherein existence of a conflict a) is checked by sorting the start and completion times of the operations in ascending order and then determining for each storage facility whether or not at the start time or completion time of an operation, a sum of the maximum withdrawals and the minimum additions that have taken place by the respective point in time with respect to all possible selections of resources for all operations exceeds the maximum inventory.

10. The method in accordance with claim 5, wherein existence of a conflict b) is checked by sorting the start and completion times of the operations in ascending order and then determining for each storage facility whether or not, at the start time or completion time of an operation, a sum of the minimum withdrawals and maximum additions that have taken place by the respective point in time with respect to all possible selections of resources for all operations is below the minimum inventory.

11. The method in accordance with claim 5, wherein existence of a conflict c) is checked by sorting the start and completion times of the operations in ascending order and then determining for each group of employees of the same qualification whether or not at the start time of an operation, a sum of a minimum demands on employees with respect to all possible selections of resources for all operations is greater than an available number due to the operations being carried out at that time.

12. The method in accordance with claim 5, wherein existence of a conflict d) is checked by sorting the start times of the operations in ascending order and then determining for each processing unit whether or not for all pairs of operations carried out on this processing unit, a time lag between an end of the first operation and a beginning of the second operation is sufficient for setup regardless of the selection of resources.

13. The method in accordance with claim 5, wherein existence of a conflict e) is checked by determining a set of selections of resources still possible for each operation, and if the set consists of a single element, assuming that the selection of resources has been made according to the element contained in the set.

14. The method in accordance with claim 5, wherein in an investigated plant occupancy plan in which a conflict has occurred, an attempt is made to solve the conflict.

15. The method in accordance with claim 14, wherein a possibility is selected to resolve a conflict that has occurred, where precedence relationships are introduced or the feasible selections of resources are restricted, and the other possibilities are stored in a decision tree.

16. The method in accordance with claim 14, wherein in a conflict case a), possibilities of delaying the completion time of an operation which, by the time of the conflict has increased the inventories in the storage where the conflict occurred in all possible selections of resources, are determined, at least delaying it until the earliest start time of an operation which after the conflict time reduces inventories of the storage in which the conflict occurred in all possible selections of resources, and these possibilities are stored in the form of precedence relationships.

17. The method in accordance with claim 14, wherein in a conflict case b), possibilities of delaying the start time of an operation which, by the time of the conflict has reduced the inventories in the storage where the conflict occurred in all possible selections of resources, are determined, at least delaying it until the earliest completion time of an operation which after the conflict time has increased the inventories of the storage in which the conflict occurred in all possible selection of resources, and these possibilities are stored in the form of precedence relationships.

18. The method in accordance with claim 14, wherein in a conflict case c), possibilities of delaying the start time of an operation which, by the time of the conflict has used the resource of employees of the same qualification where the conflict occurred in all possible selections of resources, are determined, at least delaying it until the earliest completion time of an operation which at the conflict time has used the resource of employees where the conflict occurred in all possible selections of resources, and these possibilities are stored in the form of precedence relationships.

19. The method in accordance with claim 14, wherein in a conflict case d), possibilities of delaying the start time of one of two operations involved in the conflict at least until the completion time of the other operation involved in the conflict plus the setup time between the two operations are determined, and these possibilities are stored in the form of precedence relationships.

20. The method in accordance with claim 14, wherein in a conflict case e), possibilities of restricting the set of possible selections of resources for an operation starting at a conflict time to one element are determined, and these possibilities are stored in the form of the restricted sets.

21. The method in accordance with claim 1, wherein a period of time between the fixed start of production and the completion of the last operation is minimized.

22. The method in accordance with claim 1, wherein a sum of differences between the completion times and due dates for individual operations is minimized.

23. The method in accordance with claim 1, wherein a maximum difference between the completion times and due dates for individual operations is minimized.

24. The method in accordance with claim 1, wherein a sum of objective criteria weighted with any non-negative factors, such as makespan, average lateness, and maximum lateness, is minimized.

25. The method in accordance with claim 1, wherein the productional restrictions of total availability of the resources are taken into account.

26. The method In accordance with claim 1, wherein the resources comprise groups of employees of equal qualification.

27. The method in accordance with claim 1, wherein the resources comprise processing units.

28. The method in accordance with claim 1, wherein the resources comprise inventories in storage facilities.

29. The method in accordance with claim 1, wherein a quarantine time after which one or more output materials can be processed further at the earliest time is taken into account as a productional restriction for the one or more output materials.

30. The method in accordance with claim 1, wherein a shelf life time before which one or more output materials must be processed further at the latest is taken into account as a productional restriction for the one or more output materials.

31. The method in accordance with claim 1, wherein a release date is taken into account as a productional restriction for one or more input materials.

32. The method in accordance with claim 1, wherein a latest completion time for one or more operations is taken into account as a productional restriction.

33. The method in accordance with claim 1, wherein production breaks are taken into account as a productional restriction for employees and processing units.

34. The method in accordance with claim 1, wherein the availability of resources is taken into account as a productional restriction.

35. The method in accordance with claim 1, wherein a limited usability of resources for certain operations is taken into account as a productional restriction.

36. The method in accordance with claim 1, wherein a setup time for processing units is taken into account as a productional restriction.

37. The method in accordance with claim 36, wherein a dependence of the setup time on the sequence of operations is taken into account as a productional restriction.

38. The method in accordance with claim 1, wherein a time-dependence of the availability of employees of equal qualification as resources is taken into account as a productional restriction.

39. The method in accordance with claim 38, wherein production breaks are taken into account as a productional restriction.

40. The method in accordance with claim 1, wherein minimum and maximum inventories in storage are taken into account as a productional restriction.

41. The method in accordance with claim 1, wherein the resources comprise one or more of employees, processing units, and inventories in storage facilities.

42. The method in accordance with claim 1, wherein to one or more operations a set of alternative variants that differ in duration, demand on resources as well as the materials consumed and the materials produced is assigned.

43. A computer-readable medium with a computer software product, which can be loaded directly into the internal memory of a digital computer and comprises the software code sections with which the stages of a method in accordance with claim 1 are carried out when the product is running on a computer.

44. The method in accordance with claim 1, wherein the plant is a multipurpose plant that produces final products from raw materials by means of chemical and/or physical transformation stages that are carried out in succession.

* * * * *